US012352074B2

(12) United States Patent
Luebeck

(10) Patent No.: US 12,352,074 B2
(45) Date of Patent: Jul. 8, 2025

(54) HUB ASSEMBLY FOR DOOR HANDLE

(71) Applicant: HONEYWELL INTERNATIONAL INC., Charlotte, NC (US)

(72) Inventor: Jon Marc Luebeck, Stayton, OR (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 796 days.

(21) Appl. No.: 17/254,422

(22) PCT Filed: Sep. 8, 2020

(86) PCT No.: PCT/US2020/049706

§ 371 (c)(1),
(2) Date: Dec. 21, 2020

(87) PCT Pub. No.: WO2021/050422

PCT Pub. Date: Aug. 18, 2021

(65) Prior Publication Data

US 2022/0042346 A1 Feb. 10, 2022

Related U.S. Application Data

(60) Provisional application No. 62/898,866, filed on Sep. 11, 2019.

(51) Int. Cl.
*E05B 3/02* (2006.01)
*E05B 15/00* (2006.01)
(Continued)

(52) U.S. Cl.
CPC ............ *E05B 3/02* (2013.01); *E05B 15/0033* (2013.01); *E05B 15/04* (2013.01); *E05B 63/006* (2013.01); *E05B 2015/0413* (2013.01)

(58) Field of Classification Search
CPC . Y10T 292/865; Y10T 292/82; Y10T 292/85; Y10T 292/854; Y10T 292/869;
(Continued)

(56) References Cited

U.S. PATENT DOCUMENTS 1,486,824 A 3/1924 Anderson
2,111,254 A * 3/1938 Tong ......................... E05B 3/04
292/353
(Continued)

FOREIGN PATENT DOCUMENTS

CN 206279891 6/2017
CN 106121379 5/2018
(Continued)

OTHER PUBLICATIONS

EP1258581A2, Nov. 20, 2002, Espacenet machine translation description and claims (Year: 2023).*
(Continued)

*Primary Examiner* — Kristina R Fulton
*Assistant Examiner* — Steven A Tullia
(74) *Attorney, Agent, or Firm* — Seager, Tufte & Wickhem, LLP

(57) ABSTRACT

A hub assembly for a door handle includes a hub body that extends along a longitudinal axis and has a first end portion including a spindle recess and a second end portion including a handle attachment protrusion. A spindle slideably received within the spindle recess in the first end of the hub body. A spring at least partially located within the spindle recess on the hub body and in engagement with the spindle.

19 Claims, 3 Drawing Sheets

(51) Int. Cl.
*E05B 15/04* (2006.01)
*E05B 63/00* (2006.01)

(58) Field of Classification Search
CPC . Y10T 292/876; Y10T 292/93; Y10T 292/96; Y10T 292/57; Y10T 292/53; E05B 3/02; E05B 15/02; E05B 15/0033; E05B 15/04; E05B 63/006; E05B 2015/0413; E05B 3/00; E05B 3/003; E05B 3/04; E05B 3/08; E05B 1/003; E05B 63/0056
See application file for complete search history.

(56) References Cited

U.S. PATENT DOCUMENTS

| | | | | | |
|---|---|---|---|---|---|
| 2,128,144 | A | * | 8/1938 | Heinen | E05B 3/04 292/358 |
| 2,267,939 | A | | 12/1941 | McKenzie | |
| 2,621,065 | A | | 12/1952 | Strom | |
| 2,650,123 | A | * | 8/1953 | Hopgood | E05B 55/005 292/169.18 |
| 3,425,247 | A | * | 2/1969 | Etter | E05B 55/005 292/169.18 |
| 4,470,279 | A | | 9/1984 | Neary et al. | |
| 5,598,726 | A | | 2/1997 | Cordle | |
| 5,685,584 | A | * | 11/1997 | Baren | E05B 3/08 292/358 |
| 6,038,894 | A | * | 3/2000 | Hu | E05B 55/005 292/336.5 |
| 6,101,856 | A | * | 8/2000 | Pelletier | E05B 13/101 70/472 |
| 6,131,970 | A | * | 10/2000 | Hurst | E05B 3/06 292/336.3 |
| 6,179,352 | B1 | * | 1/2001 | Schneeberger | E05B 65/0014 292/336.3 |
| 6,398,274 | B1 | * | 6/2002 | Huang | E05B 63/006 292/358 |
| 6,860,529 | B2 | * | 3/2005 | Chong | E05C 1/163 292/169.18 |
| 7,077,437 | B2 | | 7/2006 | Huang | |
| 7,604,266 | B2 | | 10/2009 | Ellis | |
| 8,079,241 | B2 | | 12/2011 | Lin | |
| 8,113,553 | B2 | | 2/2012 | Kosunen | |
| 8,161,780 | B1 | * | 4/2012 | Huml | E05B 65/1086 70/109 |
| 8,939,477 | B2 | * | 1/2015 | Welsby | E05B 55/005 292/347 |
| 8,967,686 | B2 | | 3/2015 | Rudhager et al. | |
| 9,115,509 | B2 | | 8/2015 | Huang et al. | |
| 9,752,359 | B2 | * | 9/2017 | Ali | E05B 13/108 |
| 10,329,802 | B1 | | 6/2019 | Huang et al. | |
| 10,900,254 | B2 | * | 1/2021 | Murphy | E05B 63/0069 |
| 2008/0111384 | A1 | * | 5/2008 | Ellis | E05B 3/065 292/336.3 |
| 2011/0219832 | A1 | * | 9/2011 | Lin | E05B 15/0033 70/461 |
| 2011/0302971 | A1 | * | 12/2011 | Bui | E05B 1/0007 70/461 |
| 2015/0159411 | A1 | | 6/2015 | Son | |
| 2020/0115921 | A1 | * | 4/2020 | Alber | B01D 29/05 |

FOREIGN PATENT DOCUMENTS

| | | | | | |
|---|---|---|---|---|---|
| CN | 108104598 | | | 6/2018 | |
| CN | 208456309 | | | 2/2019 | |
| CN | 104812978 | B | * | 3/2019 | E05B 1/003 |
| CN | 110670968 | A | * | 1/2020 | E05B 63/006 |
| CN | 110685508 | A | * | 1/2020 | E05B 15/0033 |
| CN | 116897241 | A | * | 10/2023 | E05B 15/0053 |
| DE | 600668 | C | * | 7/1937 | E05B 3/02 |
| DE | 764855 | C | * | 1/1942 | E05B 3/04 |
| DE | 1021748 | B | * | 1/1954 | E05B 3/02 |
| DE | 1258758 | | | 1/1968 | |
| DE | 7836758 | | | 3/1979 | |
| DE | 9401943 | | | 4/1994 | |
| DE | 29919203 | U1 | * | 3/2000 | E05B 3/04 |
| DE | 202005017497 | | | 3/2007 | |
| DE | 102007045945 | A1 | * | 7/2008 | E05B 3/04 |
| DE | 102015117330 | A1 | * | 4/2017 | E05B 15/0033 |
| DE | 202017103467 | U1 | * | 8/2017 | E05B 3/00 |
| DE | 202019102648 | U1 | * | 9/2020 | E05B 3/02 |
| DE | 102021003666 | A1 | * | 1/2022 | E05B 15/0033 |
| DE | 102020128079 | A1 | * | 4/2022 | E05B 47/0692 |
| EP | 0341656 | A2 | * | 5/1989 | E05B 17/0058 |
| EP | 0592854 | | | 12/1995 | |
| EP | 1258581 | A1 | | 11/2002 | |
| EP | 1258581 | A2 | * | 11/2002 | E05B 63/006 |
| EP | 2042671 | A2 | * | 4/2009 | E05B 15/0053 |
| EP | 2299037 | A1 | * | 3/2011 | E05B 3/04 |
| EP | 1713991 | | | 10/2012 | |
| EP | 3156564 | | | 4/2017 | |
| EP | 3203000 | A1 | * | 8/2017 | E05B 3/00 |
| EP | 3385473 | | | 10/2018 | |
| EP | 3543434 | B1 | * | 2/2021 | E05B 1/003 |
| EP | 4261364 | A1 | * | 10/2023 | E05B 15/0033 |
| ES | 2612833 | T3 | * | 5/2017 | E05B 3/00 |
| FI | 117210 | B | * | 7/2006 | E05B 63/16 |
| FR | 2379676 | | | 9/1978 | |
| FR | 2916007 | A1 | * | 11/2008 | E05B 13/005 |
| FR | 2919364 | A3 | * | 1/2009 | E05B 1/003 |
| GB | 376100 | | | 7/1932 | |
| GB | 537188 | A | * | 12/1939 | E05B 3/02 |
| GB | 558633 | A | * | 7/1942 | G05G 1/12 |
| GB | 2253240 | A | * | 9/1992 | E05B 13/005 |
| GB | 2273143 | A | * | 6/1994 | E05B 3/04 |
| GB | 2391286 | A | * | 2/2004 | E05B 3/00 |
| GB | 2504806 | A | * | 2/2014 | E05B 3/065 |
| GB | 2515458 | A | * | 12/2014 | E05B 3/00 |
| GB | 2614261 | A | * | 7/2023 | E05B 15/0033 |
| KR | 200296127 | Y1 | * | 11/2002 | E05B 3/04 |
| KR | 200325800 | Y1 | * | 9/2003 | E05B 55/005 |
| KR | 200420247 | Y1 | * | 4/2006 | E05B 15/0033 |
| KR | 200419669 | Y1 | * | 6/2006 | E05B 3/00 |
| KR | 100794215 | B1 | * | 1/2008 | E05B 15/04 |
| KR | 20090000457 | U | * | 1/2009 | E05B 3/10 |
| KR | 101045076 | B1 | * | 6/2011 | E05B 15/0033 |
| KR | 200469387 | Y1 | * | 10/2013 | E05C 3/16 |
| KR | 101755226 | B1 | * | 7/2017 | E05B 3/04 |
| WO | WO-2005019570 | A1 | * | 3/2005 | E05B 13/005 |
| WO | WO-2005047627 | A1 | * | 5/2005 | E05B 3/04 |
| WO | WO-2005090720 | A1 | * | 9/2005 | E05B 47/068 |
| WO | WO-2005108719 | A1 | * | 11/2005 | E05B 13/005 |
| WO | WO-2005111347 | A1 | * | 11/2005 | E05B 63/16 |
| WO | WO-2008145933 | A2 | * | 12/2008 | E05B 13/005 |
| WO | WO-2018076052 | A1 | * | 5/2018 | E05B 55/06 |
| WO | WO-2018224294 | A1 | * | 12/2018 | E05B 3/00 |
| WO | WO-2019087216 | A1 | * | 5/2019 | E05B 3/04 |
| WO | WO-2021030736 | A1 | * | 2/2021 | E05B 1/0007 |
| WO | WO-2021050422 | A1 | * | 3/2021 | E05B 15/0033 |

OTHER PUBLICATIONS

DE202019102648U1, Espacenet machine translation description and claims 2019 (Year: 2024).*
PR 200420247 Y1 PE2E machine translation 2006 (Year: 2024).*
KR200469387Y1 Espacenet machine translation claims and description (Year: 2024).*
International Preliminary Report on Patentability for International Application No. PCT/US2020/049706 dated Mar. 24, 2022.
International Search Report and Written Opinion for International Application No. PCT/US2020/049706 mail date of Dec. 4, 2020.
Communication Pursuant to Article 94(3) EPC, EP Application No. 20780421.2, European Patent Office, Apr. 24, 2024 (6 pages).

* cited by examiner

HUB ASSEMBLY FOR DOOR HANDLE

CROSS-REFERENCE TO RELATED APPLICATIONS

This application claims priority to U.S. Provisional Application No. 62/898,866, which was filed on Sep. 11, 2019 and is incorporated herein by reference.

BACKGROUND

Existing door handle assemblies include various components that are assembled and mounted to a door. Because doors can have varying thicknesses, existing door handle assemblies are generally made to accommodate a specific door thicknesses.

SUMMARY

In one exemplary embodiment, a hub assembly for a door handle includes a hub body that extends along a longitudinal axis and has a first end portion including a spindle recess and a second end portion including a handle attachment protrusion. A spindle slideably received within the spindle recess in the first end of the hub body. A spring at least partially located within the spindle recess on the hub body and in engagement with the spindle.

In a further embodiment of any of the above, the spindle includes a body portion that has a first pair of opposing sides. An elongated slot is located in at least one of the pair of opposing sides.

In a further embodiment of any of the above, a pin aperture is in the hub body that is at least partially aligned with the elongated slot in the spindle with a pin located in the pin aperture and the elongated slot.

In a further embodiment of any of the above, the pin includes a distal end aligned with a thickness of the spindle in the elongated slot.

In a further embodiment of any of the above, a tip portion is located at a distal end of the body portion on the spindle.

In a further embodiment of any of the above, the body portion includes a first cross-sectional area and the tip portion includes a second cross-sectional area. The first cross sectional area is larger than the second cross-sectional area.

In a further embodiment of any of the above, a spring recess is in the spindle. The spring recess includes a proximal end at an opening in a proximal end of the body portion of the spindle.

In a further embodiment of any of the above, the spring recess extends to a distal end of the body portion adjacent the tip portion.

In a further embodiment of any of the above, the pin is spaced from the spring recess in the spindle.

In a further embodiment of any of the above, the elongated slot includes a first pin contact surface at a proximal end of the elongated slot for contacting the pin when the spindle is biased toward an extended position by the spring.

In a further embodiment of any of the above, the elongated slot includes a second pin contact surface at a distal end of the elongated slot for contacting the pin when the spindle is in a fully retracted position.

In a further embodiment of any of the above, the body portion includes a spring recess for accepting the spring.

In a further embodiment of any of the above, the spindle recess includes a spindle recess opening at least partially surrounded by the hub body. A distal edge of the spindle recess includes a spring contact surface for contacting the spring.

In a further embodiment of any of the above, the hub body includes a slot in each of an opposing pair of sides of the spindle recess.

In a further embodiment of any of the above, the handle attachment protrusion includes an attachment pin aperture for securing a door handle attachment adapter to the handle assembly attachment protrusion with an adapter pin.

In another exemplary embodiment, a method of operating a hub assembly for a door handle includes the step of slideably engaging a spindle within a spindle recess on a hub body to vary a distance between a tip portion of the spindle and the hub body. The spindle is biased towards an extended position relative to the hub body with a spring located within the spindle recess.

In a further embodiment of any of the above, movement of the spindle relative to the hub body is limited within a pin at least partially located in an elongated slot in the spindle and within a pin aperture in the hub body.

In a further embodiment of any of the above, the spindle includes a body portion that has a first pair of opposing sides. The elongated slot is located in at least one of the pair of opposing sides.

In a further embodiment of any of the above, the spindle includes a body portion and a tip portion located at a distal end of the body portion on the spindle. The body portion includes a first cross-sectional area. The tip portion includes a second cross-sectional area that is smaller than the first cross sectional area.

In a further embodiment of any of the above, the hub body includes a handle attachment protrusion opposite the spindle.

DETAILED DESCRIPTION

Figure 1:
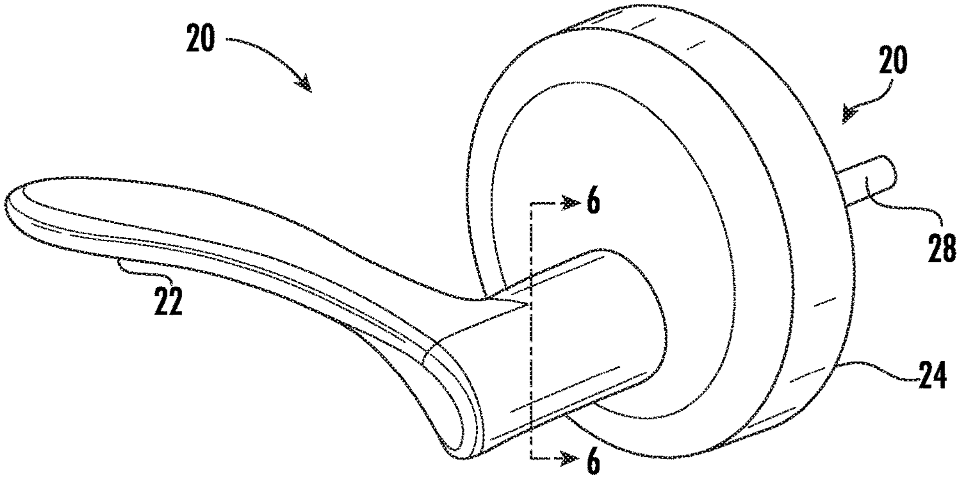
FIG. 1 illustrates a front perspective view of an example handle assembly.
Figure 2:
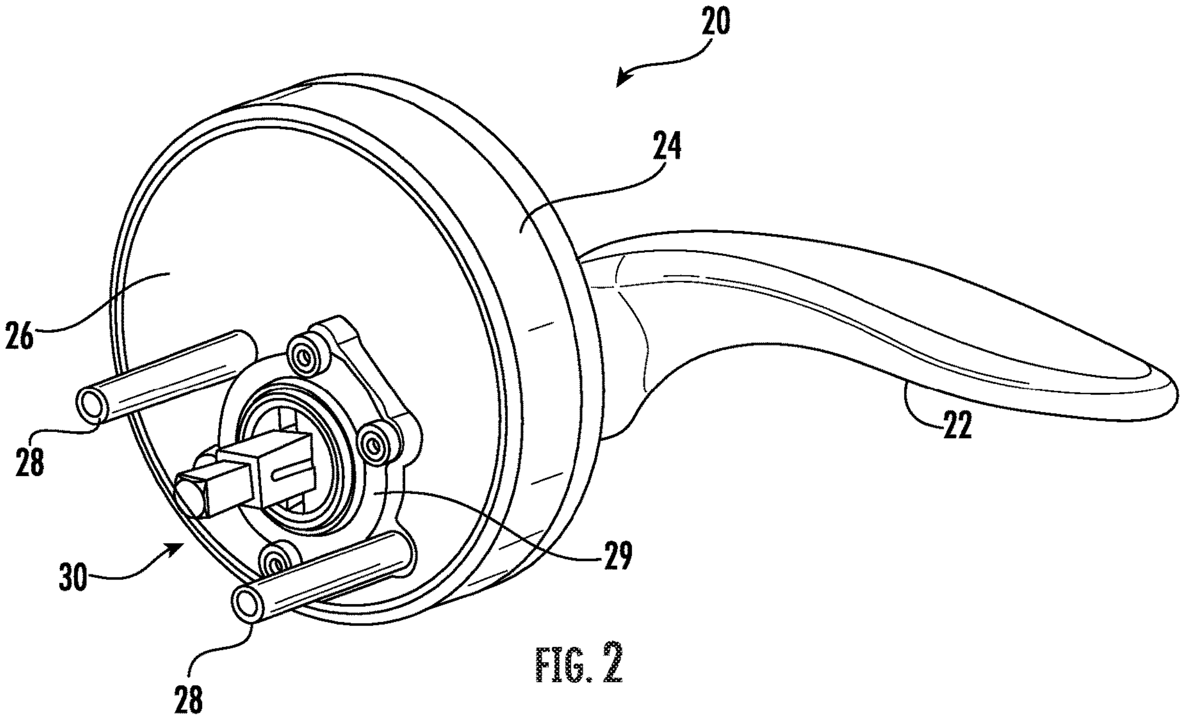
FIG. 2 illustrates a rear perspective view of the example handle assembly of FIG. 1.

FIGS. 1 and 2 illustrate an example door handle assembly 20. The door handle assembly 20 includes a handle 22 and an escutcheon plate 24 facing the handle 22 with the escutcheon plate 24 attached to and covering a mounting plate 26. A pair of screw posts 28 extend through the mounting plate 26 to facilitate securing the door handle assembly 20 to a door structure and/or another door handle assembly (not shown). A hub retainer 29 secures a hub assembly 30 to the mounting plate 26.

Figure 3:
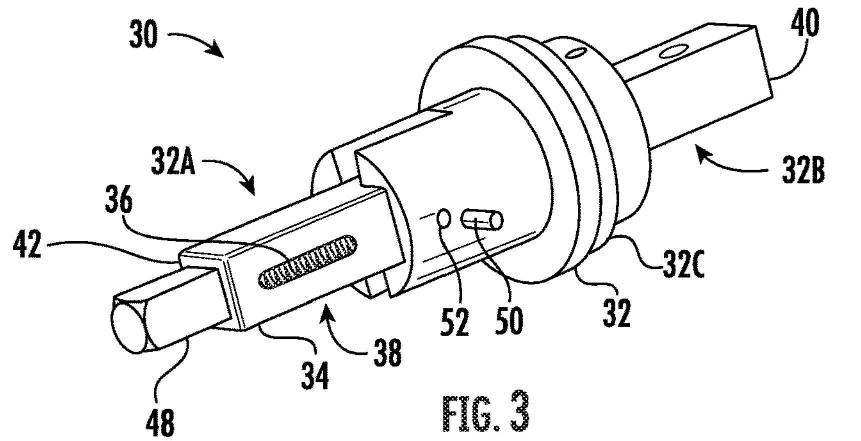
FIG. 3 illustrates an example hub assembly.
Figure 4:
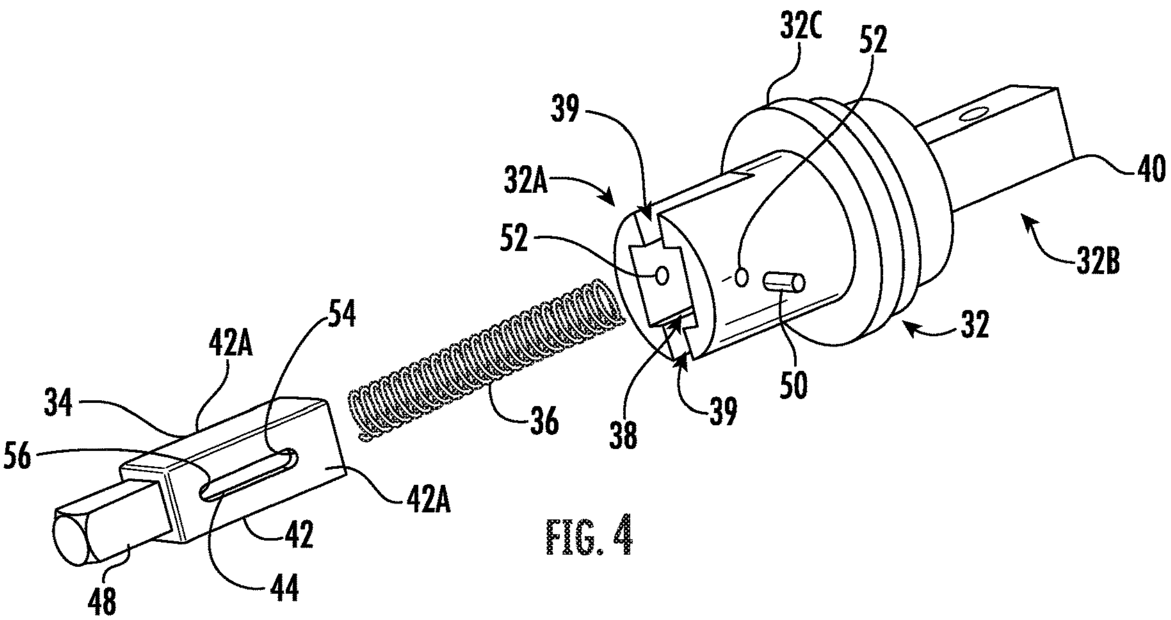
FIG. 4 illustrates a perspective exploded view of the example hub assembly of FIG. 3.
Figure 5:
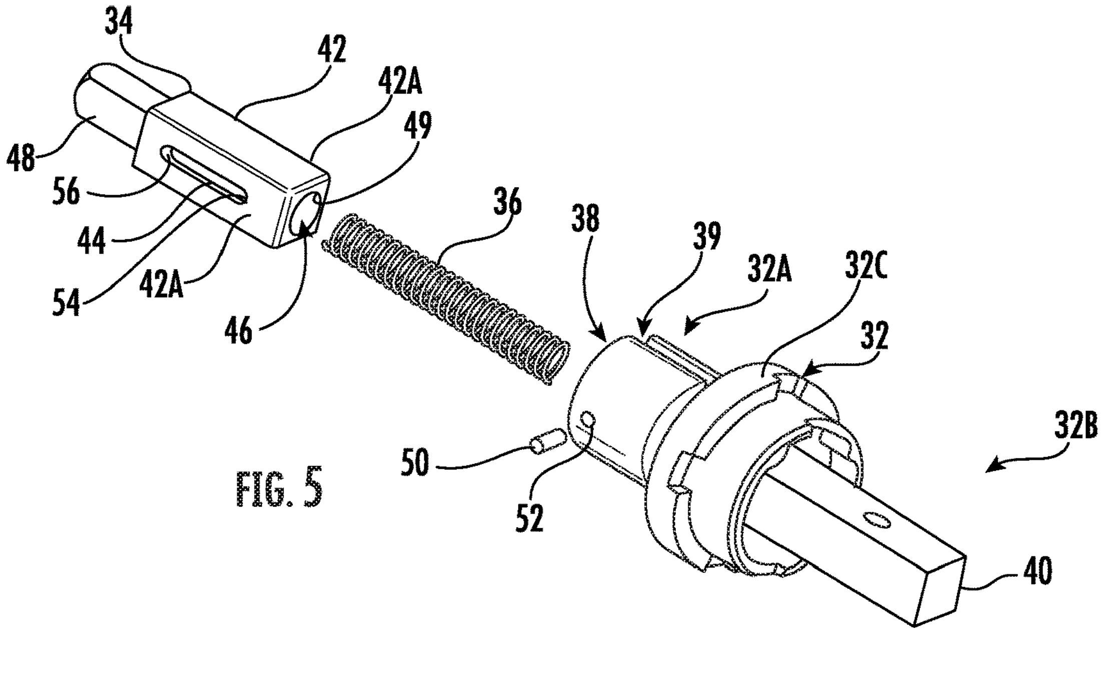
FIG. 5 illustrates another perspective exploded view of the example hub assembly of FIG. 3.
Figure 6:
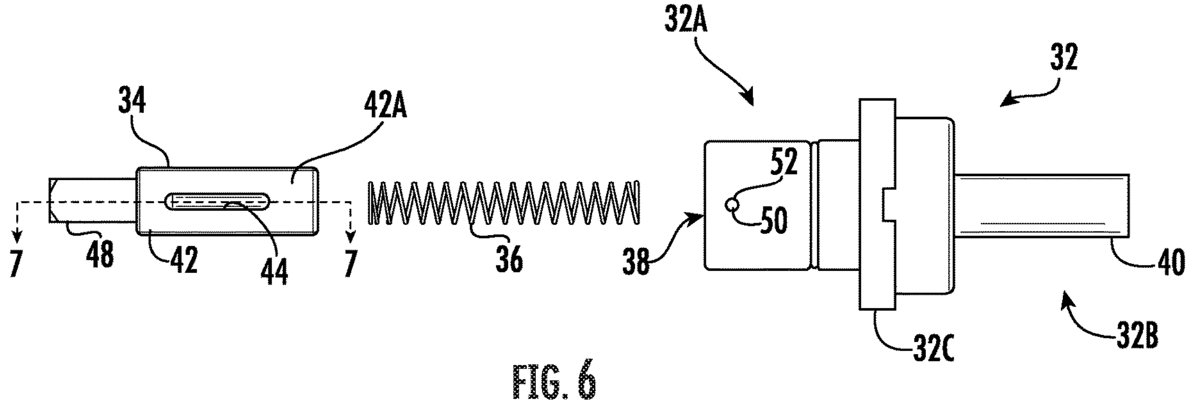
FIG. 6 illustrates a side exploded view of the hub assembly of FIG. 3.

FIG. 3 illustrates the example hub assembly 30. The example hub assembly 30 includes a hub body 32, a spindle 34, and a spring 36 in engagement with both the hub body 32 and the spindle 34. The hub body 32 extends along a central longitudinal axis and includes a first end portion 32A including a spindle recess 38 and a second end portion 32B including a handle attachment protrusion 40. The first end portion 32A surrounds the spindle recess 38 and includes a slot 39 in each opposing side of the spindle recess 38 (FIGS. 3-5 and 8). A mid-portion 32C connects the first end portion 32A and the second end portion 32B. The mid-portion 32C includes a larger diameter that the first end portion 32A and the second end portion 32B.

In the illustrated example, the spindle 34 is slidably received within the spindle recess 38 located in the first end portion 32A of the hub body 32. The spring 36 is at least partially located in the spindle recess 38 on the hub body 32 and is in engagement with the spindle 34 at a first end of the spring 36 and the hub body 32 at a second end of the spring 36. The second end of the spring 36 can be in contact with the either the first end portion 32A of the hub body 32 or the mid-portion 32C of the hub body 32. Although the spring 36 is illustrated as a coil spring, other types of springs could be used such as polymer based resilient members.

As shown in FIGS. 3-7, the spindle 34 includes a body portion 42 having a first pair of opposing sides 42A that each include an elongated slot 44. In the illustrated example, the elongated slot 44 extends through the body portion 42 into a spring recess 46 formed in an interior of the spindle 34. However, each pair of opposing sides of the body portion 42 could include one of the elongated slots 44 such that there are four elongated slots 44 in the body portion 42. The spring recess 46 allows the spring 36 to extend through an opening 49 to the spring recess 46 at a first end of the body portion 42 towards a second or distal end of the body portion 42. At the second or distal end of the body portion 42, the spindle 34 includes a spring contact surface 47 (FIG. 7) that engages the spring 36. The spindle 34 also includes a tip portion 48 for engaging a locking portion or mortice (not shown). In the illustrated example, the body portion 42 includes a larger cross-sectional area than the tip portion 48. Additionally, the distal end of the tip portion 48 includes rounded corners to facilitate insertion into the locking portion. However, the body portion 42 could include a constant diameter to engage and drive a mortice lock.

When the spindle 34 is inserted into the spindle recess 38, a retention pin 50 is used to retain the spindle 34 within the spindle recess 38 in the hub body 32. In the illustrated example, the retention pin 50 includes a distal end that is aligned with the elongated slot 44 in the spindle 34 and the retention pin 50 is accepted within a pin aperture 52 in the hub body 32. Furthermore, the distal end of the retention pin 50 is aligned with a thickness of the body portion 42 in the elongated slot 44 to prevent the retention pin 50 from extending into the spring recess 46 in the spindle 34. This prevents the spring 36 from engaging the retention pin 50 and restricting movement of the spring 36.

An outer dimension of the body portion 42 is sized relative to the spindle recess 38 to allow for sliding movement of the spindle 34 and to prevent relative movement of the spindle 34 relative to the hub body 32 in a direction other than along the central longitudinal axis of the hub body 32.

Although the hub body 32 includes two pin apertures 52 and the spindle 34 includes at least one elongated slots 44, the spindle 34 can be retained relative to the hub body 32 with only a single retention pin 50 located in one of the pin apertures 52 and in engagement with one of the elongated slots 44. However, two retention pins 50 can be used in each of the pin apertures 52 and elongated slots if desired. However, one feature of having at least one elongated slots 44 aligned with corresponding pin apertures 52 is improved assembly or disassembly of the hub assembly 30 based on which side is more accessible when installed in the door handle assembly 20.

Figure 7:
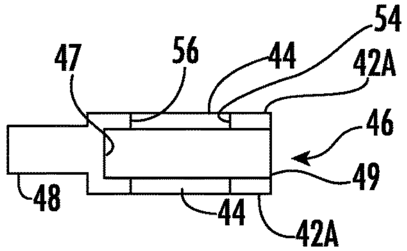
FIG. 7 illustrates a cross-sectional view of a spindle taken along line 7-7 of FIG. 6.
Figure 8:
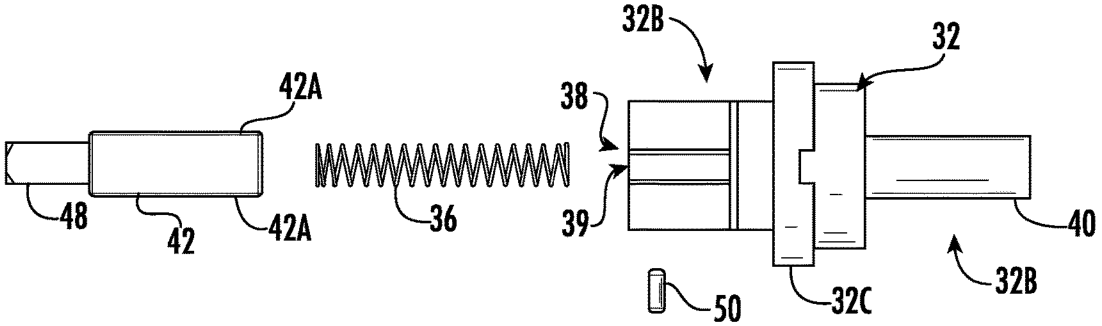
FIG. 8 illustrates a top exploded view of the hub assembly of FIG. 3.

While the spindle 34 slides in the spindle recess 38 in the hub body 32, the retention pin 50 limits the motion of the spindle 34 longitudinally relative to the hub body 32. In particular, the retention pin 50 engages a first end 54 of the elongated slot 44 when in a fully extended position and the retention pin 50 engages a second end 56 of the elongated slot 44 when in a fully compressed or retracted position (FIG. 7).

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A hub assembly for a door handle comprising:

a hub body extending along a longitudinal axis having a first end portion including a spindle recess and a second end portion including a handle attachment protrusion, wherein the hub body includes a mid-portion that connects the first end portion and the second end portion;

a spindle slideably received within the spindle recess in the first end of the hub body, and wherein the spindle comprises a body portion with a spring recess that is open at a first end of the body portion and closed at a second end of the body portion to provide a spring contact surface, wherein the body portion has a first pair of opposing longitudinally extending sides and a second pair of opposing longitudinally extending sides giving the body portion a rectangular shape and an elongated longitudinally extending slot is located in at least one of the first pair of opposing longitudinally extending sides and is co-axial with the longitudinal axis; and a spring having a first end in contact with either the first end portion or the mid-portion of the hub body and the spring having a second end extending into the spring recess and engaging the spring contact surface, and wherein the spring is co-axial with the longitudinal axis.

2. The assembly of claim 1, further comprising a pin aperture in the hub body that is at least partially aligned with the elongated longitudinally extending slot in the spindle with a pin located in the pin aperture and the elongated longitudinally extending slot.

3. The assembly of claim 2, wherein the pin includes a distal end aligned with a thickness of the spindle in the elongated longitudinally extending slot.

4. The assembly of claim 2, further comprising a tip portion located at a distal end of the body portion on the spindle.

5. The assembly of claim 4, wherein the body portion includes a first cross-sectional area and the tip portion includes a second cross-sectional area and the first cross-sectional area is larger than the second cross-sectional area.

6. The assembly of claim 4, wherein the spring recess extends to a distal end of the body portion adjacent the tip portion.

7. The assembly of claim 2, wherein the pin is spaced from the spring recess in the spindle.

8. The assembly of claim 2, wherein the elongated longitudinally extending slot includes a first pin contact surface at a proximal end of the elongated slot for contacting the pin when the spindle is biased toward an extended position by the spring.

9. The assembly of claim 8, wherein the elongated longitudinally extending slot includes a second pin contact surface at a distal end of the elongated longitudinally extending slot for contacting the pin when the spindle is in a fully retracted position.

10. The assembly of claim 1, wherein the elongated longitudinally extending slot is open to the spring recess.

11. The assembly of claim 1, wherein the spindle recess includes a spindle recess opening tallest partially surrounded by the hub body and wherein the first end portion comprises a distal edge of the spindle recess that includes a spring contact surface for contacting the first end of the spring.

12. The assembly of claim 11, wherein the hub body includes at least one elongated longitudinally extending slot in each of the first pair of opposing longitudinally extending sides of the spindle recess that is open to the spring recess, wherein the at least one elongated longitudinally extending slot has one slot end open to an end face of the first end portion of the hub body and extends toward the mid-portion of the hub body to terminate at an opposite slot end that is open to an outer surface of the hub body.

13. The assembly of claim 11, wherein the distal edge of the spindle recess comprises an end face of the first end portion, and wherein the first end of the spring is in contact with the end face.

14. The assembly of claim 1, wherein the handle attachment protrusion includes an attachment pin aperture for securing a door handle attachment adapter to the handle attachment protrusion with an adapter pin.

15. The assembly of claim 1, wherein the mid-portion comprises a larger diameter than the first end portion and the second end portion.

16. A method of operating a hub assembly for a door handle comprising the steps of:

providing a spindle which comprises a body portion with a spring recess that is open at a first end of the body portion and closed at a second end of the body portion to provide a spring contact surface, wherein the body portion has a first pair of opposing longitudinally extending sides and a second pair of opposing longitudinally extending sides giving the body portion a rectangular shape and an elongated longitudinally extending slot is located in at least one of the first pair of opposing longitudinally extending sides, wherein the elongated longitudinally extending slot is co-axial with a central longitudinal axis of the hub assembly;

providing a hub body extending along the central longitudinal axis and having a first end portion including a spindle recess, a second end portion including a handle attachment protrusion, and amid-portion that connects the first end portion and the second end portion;

slideably engaging the spindle in the hub body, the spindle engaging within the spindle recess in the hub body to vary a distance between a tip portion of the spindle and the hub body;

biasing the spindle towards an extended position relative to the hub body with a spring having a first end in contact with either the first end portion or the mid-portion of the hub body, and a second end extending into the spring recess and engaging the spring contact surface, and wherein the spring is co-axial with the central longitudinal axis; and limiting movement of the spindle relative to the hub body with a pin at least partially located in an elongated longitudinally extending slot in the spindle and within a pin aperture in the hub body.

17. The method of claim 16, wherein the spindle includes a tip portion located at a distal end of the body portion on the spindle and the body portion includes a first cross-sectional area and the tip portion includes a second cross-sectional area that is smaller than the first cross sectional area.

18. The method of claim 17, wherein the hub body includes a handle attachment protrusion opposite the spindle.

19. The method of claim 16, wherein the mid portion comprises a larger diameter than the first end portion and the second end portion, and wherein the first end portion comprises a distal end face of the first end portion that surrounds the spindle recess, wherein the distal end face comprises a spring contact surface that contacts the first end of the spring.

* * * * *